United States Patent
Takatsuka et al.

(10) Patent No.: US 9,583,783 B2
(45) Date of Patent: Feb. 28, 2017

(54) PRISMATIC SECONDARY BATTERY

(71) Applicant: Hitachi Automotive Systems, Ltd., Hitachinaka-shi, Ibaraki (JP)

(72) Inventors: Yuichi Takatsuka, Hitachinaka (JP); Yoshio Onodera, Hitachinaka (JP); Ryousei Kawai, Hitachinaka (JP); Suguru Watashi, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/422,439

(22) PCT Filed: Jun. 26, 2013

(86) PCT No.: PCT/JP2013/067434
§ 371 (c)(1),
(2) Date: Feb. 19, 2015

(87) PCT Pub. No.: WO2014/034241
PCT Pub. Date: Mar. 6, 2014

(65) Prior Publication Data
US 2015/0236369 A1    Aug. 20, 2015

(30) Foreign Application Priority Data

Aug. 31, 2012   (JP) ................................. 2012-192109

(51) Int. Cl.
  *H01M 4/13*   (2010.01)
  *H01M 10/04*   (2006.01)
(52) U.S. Cl.
  CPC .... *H01M 10/0431* (2013.01); *H01M 2220/20* (2013.01)

(58) Field of Classification Search
  CPC ........ H01M 10/0431; H01M 2220/20; H01M 2/20–2/348
  See application file for complete search history.

(56) References Cited

U.S. PATENT DOCUMENTS

| | | | |
|---|---|---|---|
| 2001/0019797 A1* | 9/2001 | Kezuka | H01M 2/26 429/161 |
| 2005/0277018 A1* | 12/2005 | Kim | H01M 2/16 429/120 |

(Continued)

FOREIGN PATENT DOCUMENTS

| | | |
|---|---|---|
| JP | 2009-032640 A | 2/2009 |
| JP | 2011-049066 A | 3/2011 |

(Continued)

*Primary Examiner* — Cynthia K Walls
(74) *Attorney, Agent, or Firm* — Volpe and Koenig, P.C.

(57) ABSTRACT

A prismatic secondary battery includes: an electrode group including electrodes formed of positive electrodes and negative electrodes each having an active material layer coated on a surface of a metallic foil, the electrodes formed of positive and negative electrodes are flatly wound together with a separator intervening with the positive and negative electrodes, the positive and negative electrodes being each formed with a metallic foil exposed section at one end in a direction of a winding axis L; and connection plates that electrically connect the electrode group and electrode terminals. The metallic foil exposed sections of the electrode group and the connection plates are press-joined. At least a portion of the press-joined sections constituted by the metallic foil exposed sections and the connection plates is covered with a resin material.

8 Claims, 11 Drawing Sheets

(56) References Cited

U.S. PATENT DOCUMENTS

| | | | |
|---|---|---|---|
| 2009/0004561 A1 | 1/2009 | Nansaka et al. | |
| 2010/0035144 A1* | 2/2010 | Oh ..................... | H01M 2/021 |
| | | | 429/164 |
| 2011/0052976 A1 | 3/2011 | Ishii et al. | |
| 2012/0021276 A1 | 1/2012 | Takatsuka et al. | |

FOREIGN PATENT DOCUMENTS

| | | |
|---|---|---|
| JP | 2011-192517 A | 9/2011 |
| JP | 2011-192518 A | 9/2011 |
| JP | 2012-028033 A | 2/2012 |

* cited by examiner

PRISMATIC SECONDARY BATTERY

TECHNICAL FIELD

The present invention relates generally to prismatic secondary batteries, and more particularly to prismatic secondary batteries that are designed to be mounted on vehicles, for example.

BACKGROUND ART

Lithium-ion secondary batteries high in energy density have traditionally been developed for use as motive power sources for electric automobiles, for example. Notably, prismatic secondary batteries having high volumetric densities are known as secondary batteries that are mounted on vehicles and the like. These prismatic secondary batteries are formed as follows: a positive electrode pre-coated with a positive electrode active material on both sides of a positive electrode foil, and a negative electrode pre-coated with a negative electrode active material on both sides of a negative electrode foil are flatly wound together with a separator intervening the positive and negative electrodes. And then, this wound body (electrode group) is stored in a prismatic battery casing.

In such a prismatic secondary battery, after a positive electrode metallic foil and a negative electrode metallic foil at both ends of the wound body are exposed in a direction of its winding axis, metallic foil exposed sections are formed. Then connecting electrode terminals and current-collector bodies to the metallic foil exposed sections by welding or the like minimizes lengths of current-flow pathways to thereby cause lower connection resistance.

In a case where a horn and an anvil are used to hold a metallic foil exposed section and current-collector body and weld them, pressing force upon the horn would deform the anvil and cause a welding defect to occur between the metallic foil exposed section and the current-collector body when, for example, the anvil is cantilever-supported.

To solve such a problem, Patent Document 1 discloses a technique for welding a metallic foil exposed section and a current-collector body together after dividing the metallic foils of the metallic foil exposed section of a wound body into two sections to reduce the number of metallic foils sandwiched by the horn and the anvil.

PRIOR ART LITERATURE

Patent Document

Patent Document 1: JP-2011-192517-A

SUMMARY OF THE INVENTION

Problem to be Solved by the Invention

The use of the technique disclosed in Patent Document 1 enables welding strength to be stabilized by the reduced number of metallic foils sandwiched by the horn and the anvil, and thus reduced welding energy enables fouling of the weld to be inhibited.

It is known that if a metallic foil exposed section and a current-collector body are connected together by means of ultrasonic welding, laser welding, friction stir welding, or the like, small pieces of metal will fall off from the metallic foil exposed section and current-collector body connected together. In a case where the small pieces of metal that have fallen off from the metallic foil exposed section and the current-collector body are entrained in a battery casing, this could cause micro short circuit due to possible ingress of the metallic pieces into a wound body as foreign substances.

The present invention has been made with the foregoing problem taken into consideration, and an object of the invention is to provide a highly reliable prismatic secondary battery that deters any foreign substances; derived from an electrode group, current-collector plates, or other elements joined together from entering the electrode group.

Means for Solving the Problem

A prismatic secondary battery according to an aspect of the present invention made for solving the above problem includes: an electrode group including electrodes formed of positive electrodes and negative, electrodes each having an active material layer coated on a surface of a metallic foil, the former electrodes being flatly wound together with a separator intervening the positive and negative electrodes, the positive and negative electrodes being each formed with a metallic foil exposed section at one end in a, direction of a winding axis; and connection plates that electrically connect the electrode group and electrode terminals. The metallic foil exposed sections of the electrode group and the connection plates are press-joined. At least a portion of the press-joined sections constituted by the metallic foil exposed sections and the connection plates is covered with a resin material.

Effect of the Invention

In the present invention, since at least a portion of the press-joined sections constituted by the metallic foil exposed sections of the electrode group and connection plates is covered with a resin material, in a case where small pieces of metal arise from the metallic foil exposed sections and connection plates connected together, a fall-off of the pieces of metal from the press-joined sections would be prevented. Thus, when the electrode group that has been coupled to the connection plates are stored in a battery casing, ingress of the pieces of metal as foreign matters from the press-joined sections into the electrode group can be inhibited, which in turn stops micro short circuit, for example, and hence enhances reliability of the prismatic secondary battery.

Other issues, means, and advantageous effects will be made apparent in the following description of embodiments.

MODE FOR CARRYING OUT THE INVENTION

Hereunder, prismatic secondary batteries according to embodiments of the present invention will be described with reference to the accompanying drawings

First Embodiment

A first embodiment in which a prismatic secondary battery according to the present invention is applied to a lithium-ion secondary battery will be first described below with reference to FIGS. 1 to 5.

Figure 1:
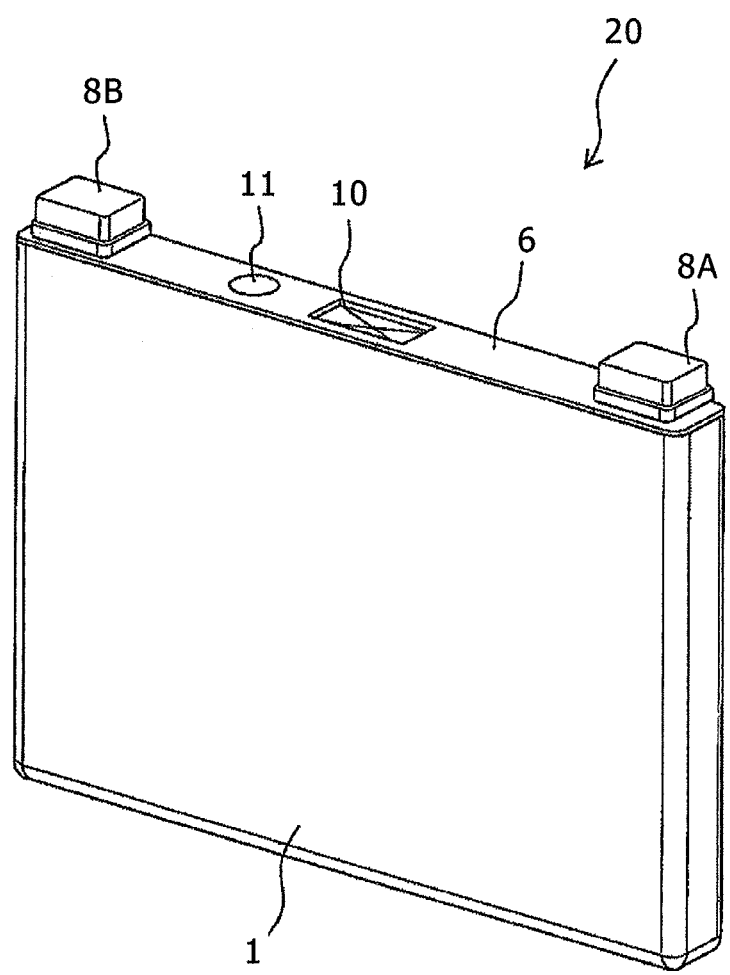
FIG. 1 is an overall perspective showing an external view of a prismatic secondary battery according to a first embodiment of the present invention.

FIG. 1 is a perspective showing an external view of the prismatic secondary battery according to the first embodiment of the present invention.

The prismatic secondary battery 20 shown in FIG. 1 includes a battery casing 1 and a cover 6. An electrode group 3 (see FIG. 2) serving as an electricity generator is stored in the battery casing 1. The battery casing 1 has its upper opening blocked with the cover 6. The cover 6 is connected to the battery casing 1 by laser welding, the battery casing 1 and the cover 6 constituting a container of the battery.

A positive electrode external terminal 8A and a negative electrode external terminal 8B are disposed on the cover 6. The electrode group 3 (see FIG. 2) is electrically charged via the positive electrode external terminal 8A and the negative electrode external terminal 8B. Electric power is also supplied to an external load via the terminals 8A and 8B. In addition, a gas venting valve 10 is disposed integrally with the cover 6. When a pressure inside the battery container increases, the gas venting valve 10 opens to discharge an internal gas from the battery container and reduce the internal pressure of the battery container. These operations ensure the safety of the prismatic secondary battery 20. Furthermore, the cover 6 includes a filler plug 11 connected thereto by welding, and the filler plug 11 is blocked up, with a filling port 9 (see FIG. 2) for filling the battery casing 1 with an electrolyte solution.

Figure 2:
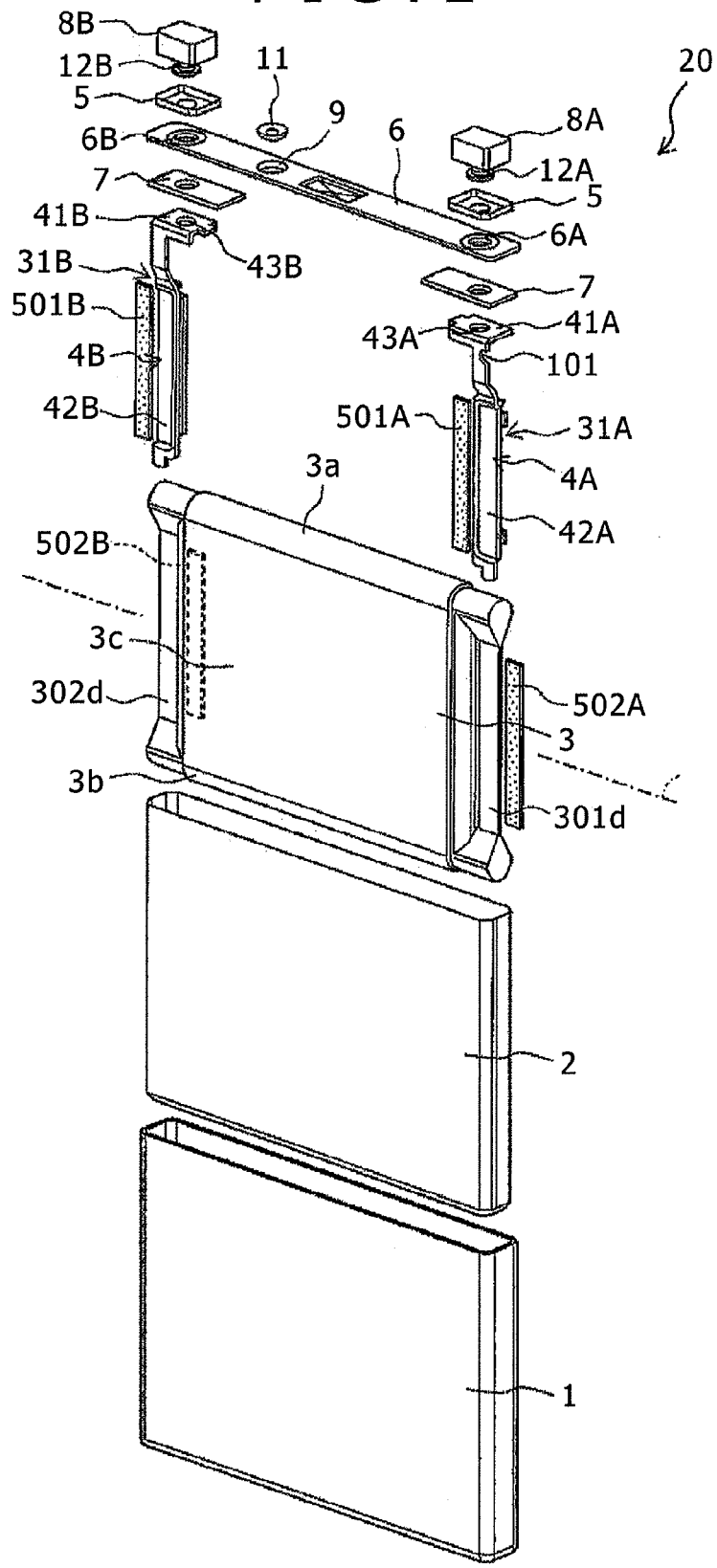
FIG. 2 is an exploded perspective view showing the prismatic secondary battery of FIG. 1 in exploded form.

FIG. 2 is a perspective view showing the prismatic secondary battery of FIG. 1 in an exploded form.

Inside the battery casing 1 of the prismatic secondary battery 20 shown in FIG. 2, the electrode group 3 is stored via an insulating sheet 2.

Winding a positive electrode body (positive electrode) 301 and a negative electrode body (negative electrode) 302 together into a flat shape with a separator 303 interposed (see FIG. 3) about a winding axis L forms, the electrode group 3. The electrode group 3 includes a pair of curved sections, 3a and 3b, and a planar section 3c, the curved sections having their substantially semi-circular cross-section surfaces opposed to each other, the planer section being continuously formed between the pair of curved sections 3a and 3b. At least portions of metallic foil exposed sections (described later herein) of the electrode group 3, that is, at least portions of an exposed positive electrode foil section 301d and a portion of an exposed negative electrode foil section 302c are bundled together into a flat sheet-like shape to form a bundled positive-electrode flat sheet-like section 301d and a bundled negative-electrode flat sheet-like section 302d. Consequently, the bundled positive-electrode flat sheet-like section 301d and bundled negative-electrode flat sheet-like section 302d that have thus been formed are respectively overlapped on and connected to one end (connection part 42A) of a positive electrode current collector plate 4A and one end (connection part 42B) of a negative electrode current-collector plate 4B by means of welding or the like. The electrode group 3 is inserted from one of the curved sections, namely 3b, into the battery casing 1 in such an orientation as to render a direction of the winding axis L parallel to a lateral direction of the battery casing 1. The electrode group 3 is then disposed so that the other curved section, namely 3a, can be positioned at the upper opening side of the battery casing 1.

The other end of the positive electrode current-collector plate 4A and that of the negative electrode current-collector plate 4B are respectively connected to the positive electrode external terminal 8A and the negative electrode external terminal 8B. In addition, the positive electrode external terminal 8A and the negative electrode external terminal 8B each have a welding connection part that is coupled to, for example, a busbar (not shown) by means of welding. The welding connection part, being of a regularly parallelepiped block shape protruding upward from the cover 6, has a lower surface opposed to an upper surface of the cover 6 and further has an upper surface parallel thereto at a predetermined vertical position.

A positive electrode connecting section 12A for connecting the positive electrode external terminal 8A and the positive electrode current-collector plate 4A is integrally formed at the lower surface of the welding connection part of the positive electrode external terminal 8A. A negative electrode connecting section 12B for connecting the negative electrode external terminal 8B and the negative electrode current-collector plate 4B is integrally formed at the lower surface of the welding connection part of the negative electrode external terminal 8B.

The positive electrode current-collector plate 4A and the negative electrode current-collector plate 4B respectively have rectangular proximal portions 41A and 41B that face a lower surface of the cover 6. The proximal portions 41A and 41B are formed with open holes 43A and 43B, through which are passed the positive electrode connecting section 12A and negative electrode connecting section 12B formed under the positive electrode external terminal 8A and the negative electrode external terminal 8B, respectively. The positive electrode current-collector plate 4A and the negative electrode current-collector plate 4B also respectively have connection parts 42A and 42B that are first bent at side ends of the proximal portions 41A and 41B. The plates then extend toward a lower surface side of the battery casing 1 and along lateral edges of wide faces of the battery casing 1 before being connected to the bundled positive-electrode flat sheet-like section 301d and bundled negative-electrode flat sheet-like section 302d of the electrode group 3 in an overlapped and opposed manner.

The positive electrode connecting section 12A of the positive electrode external terminal 8A and the negative electrode connecting section 12B of the negative electrode external terminal 8B have a cylindrical shape formed so that those distal ends of the positive electrode-external terminal 8A and negative electrode external terminal 8B that protrude from lower surfaces of these external terminals can be inserted into through-holes 6A and 6B of the cover 6. The positive electrode connecting section 12A and the negative electrode connecting section 12B extend through the cover 6 via the through-holes 6A and 6B, and protrude more inward of the battery casing 1 than the proximal portions 41A and 41B of the positive electrode current-collector plate 4A and the negative electrode current-collector plate 4B. The positive electrode connecting section 12A and the negative electrode connecting section 12B are then crimped at respective distal ends thereof. Consequently, the positive electrode external terminal 8A and the positive electrode current-collector plate 4A are integrally fixed to the cover 6. In a similar way the negative electrode external terminal 8B and the negative electrode current-collector plate 4B are integrally fixed to the cover 6. At this time, gaskets 5 are interposed between the positive electrode external terminal 8A, the negative electrode external terminal 8B, and the cover 6 whereas insulating plates 7 are interposed between the positive electrode current-collector plate 4A, the negative electrode current-collector plate 4B, and the cover 6. The positive electrode external terminal 8A and the negative electrode external terminal 8B are electrically insulated from the cover 6 by way of the gaskets 5 and the insulating plates 7. Similarly, the positive electrode current-collector plate 4A and the negative electrode current-collector plate 4B are electrically insulated from the cover 6 via the gaskets 5 and the insulating plates 7.

The cover 6 is formed with the filling port 9, from which the battery casing 1 is filled with an electrolyte solution. Thereafter, the filler plug 11 is welded onto the filling port 9 to hermetically seal the prismatic secondary battery 20.

The positive electrode current-collector plate 4A also includes current cutoff means 101 that cuts off a flow of an excessive current into an intermediate section of the current-collector plate 4A. The current cutoff means 101 is formed in, for example, a narrow portion of the positive electrode current-collector plate 4A. In case of overcurrent, this narrow portion fuses to separate the positive electrode current-collector plate 4A between the electrode group 3 and the positive electrode external terminal 8A. The current cutoff means 101 may be formed in the negative electrode current-collector plate 4B or formed in both of the positive electrode current-collector plate 4A and the negative electrode current-collector plate 4B. The current cutoff means 101 is not limited to the above configuration as long as it can cut off a current that flows into the current-collector plate in a case where overcurrent flows.

The battery casing 1, the cover 6, the positive electrode current-collector plate 4A, and the positive electrode external terminal 8A are fabricated from aluminum or an aluminum alloy. Meanwhile, the negative electrode current-collector plate 4B and the negative electrode external terminal 8B are fabricated from copper or a copper alloy.

In a case where ultrasonic welding, laser welding, friction stir welding, or the like is employed at this time for pressure connections between the bundled positive-electrode flat sheet-like section 301d of the electrode group 3 and the connection part 42A of the positive electrode current-collector plate 4A and between the bundled negative-electrode flat sheet-like section 302d and the connection part 42B of the negative electrode current-collector plate 4B, then small pieces of metal and/or the like could fall off from the pressure connections and enter the electrode group 3 inside the battery casing 1. In the present (first) embodiment, therefore, pressure sensitive adhesive tapes 501A and 502A are disposed on an outer surface of a positive electrode side press-joined section 31A formed between the bundled positive-electrode flat sheet-like section 301d of the electrode group 3 and the connection part 42A of the positive electrode current-collector plate 4A. Similarly, pressure sensitive adhesive tapes 501B and 502B are disposed on an outer surface of a negative electrode side press-joined section 31B formed between the bundled negative-electrode flat sheet-like section 302d and the connection part 42B of the negative electrode current-collector plate 4B.

More specifically, the pressure sensitive adhesive tape 501A is disposed on, among all surface regions of the positive electrode side press-joined section 31A, an outer surface of a planar portion of the connection part 42A of the positive electrode current-collector plate 4A. In other words, the tape 501A is disposed on, among all the outer surface regions of the planar portion of the connection part 42A, a surface opposed to a surface placed in an abutting and connected manner with the bundled positive-electrode flat sheet-like section 301d of the electrode group 3. Similarly to the above, the pressure sensitive adhesive tape 502A is disposed on an outer surface of a planar portion of the bundled Positive-electrode flat sheet-like section 301d of the electrode group 3. In other words, the tape 502A is disposed on, among all the outer surface regions of the planar portion of the bundled positive-electrode flat sheet-like section 301d, a surface opposed to a surface placed in an abutting and connected manner with the connection part 42A. Additionally, the pressure sensitive adhesive tape 501B is disposed on, among all surface regions of the negative electrode side press-joined section 31B, at least an outer surface of a planar portion of the connection part 42B of the negative electrode current-collector plate 4B. In other words, the tape 501B is disposed on, among all the outer surface regions of the planar portion of the connection part 42B, a surface opposed to a surface placed in an abutting and connected manner with the bundled negative-electrode flat sheet-like section 302d of the electrode group 3. Similarly, the pressure sensitive adhesive tape 502B is disposed on an outer surface of a planar portion of the bundled negative-electrode flat sheet-like section 302d of the electrode group 3 (i.e., among all the outer surface regions of the planar portion of the bundled negative-electrode flat sheet-like section 302d, a surface opposed to a surface placed in an abutting and connected manner with the connection part 42B).

The step of disposing the resin-made pressure sensitive adhesive tapes 501A, 502A, 501B, and 502B on the press-joined sections 31A and 31B formed between the electrode group 3 and the current-collector plates 4A and 4B will be described below with reference to FIGS. 3 to 5.

Figure 3:
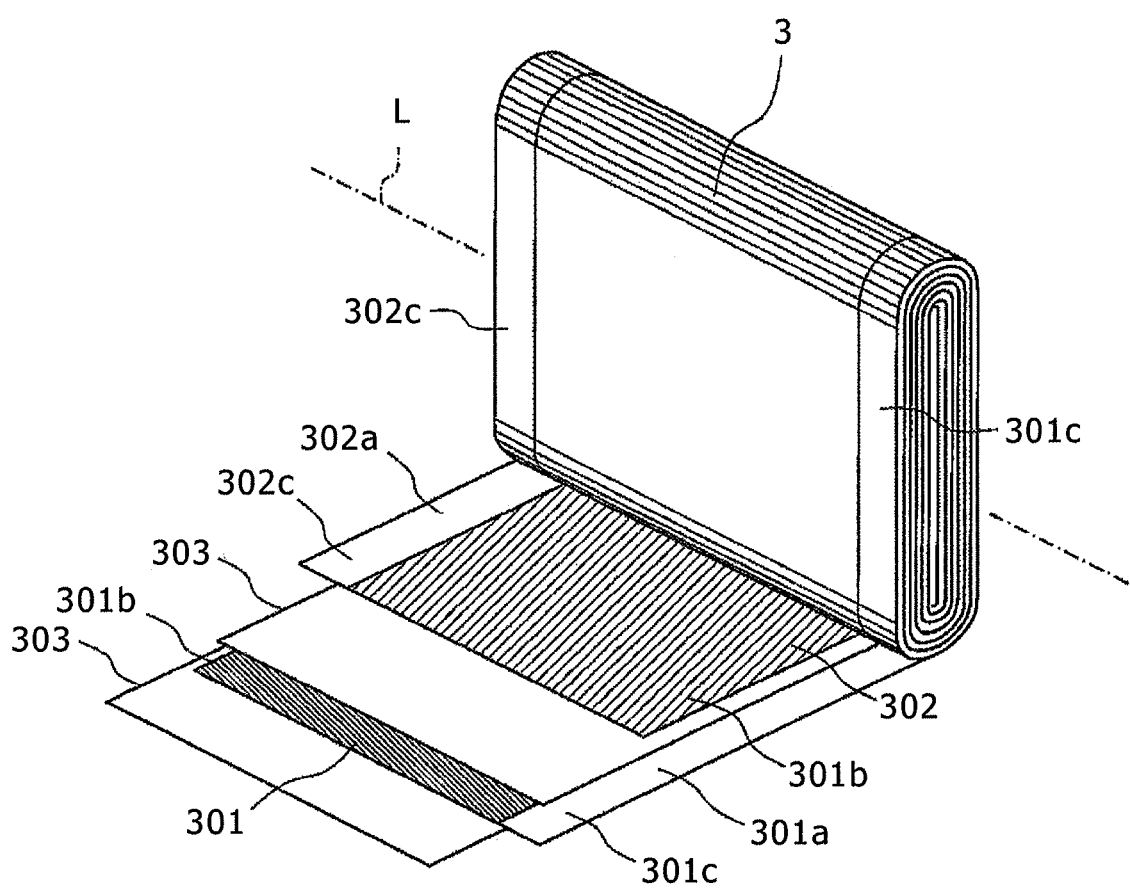
FIG. 3 is a perspective view showing at electrode group of FIG. 2 in a partially developed condition.

FIG. 3 shows the electrode group of FIG. 2 in a partially developed condition. The electrode group 3 prior to the metallic foil exposed sections of the positive electrode body (positive electrode) and the negative electrode body (negative electrode) being bundled and connected together is shown in FIG. 3.

As shown in FIG. 3, the electrode group 3 is formed by the positive electrode body 301 and the negative electrode body 302 being flatly wound with the a separator 303 interposed about the winding axis L. The positive electrode body 301 here is coated with a positive electrode materials mixture 301b on both sides of a positive electrode foil (metallic foil) 301a to thereby form an active material layer. The positive electrode foil 301a is not coated at one end thereof in a lateral direction (direction of the winding axis L) with the positive electrode materials mixture 301b. The positive electrode body 301 includes the exposed positive electrode foil section 301c, which is an exposed section of the positive electrode foil 301a. The negative electrode body 302 is coated with a negative electrode materials mixture 302b on both sides of a negative electrode foil (metallic foil) 302a to thereby form an active material layer. The negative electrode foil 302a is not coated at one end of the metallic foil in a lateral direction (direction of the winding axis L) with the negative electrode materials mixture 302b. The negative electrode body 302 includes the exposed positive electrode foil section 302c, which is an exposed section of the negative electrode foil 302a. The positive electrode body 301 and the negative electrode body 302 are wound about the winding axis L so that the exposed positive electrode foil section 301c and the exposed negative electrode foil section 302c are arranged at opposite sides in the direction of the winding axis L.

Ways to fabricate the electrode bodies 301 and 302 will be briefly explained below. When the negative electrode body 302 is to be made, polyvinylidene difluoride (PVDF) is, first added as a binder to amorphous carbon powder at a mass rate of 1:10 and N-methylpyrrolidone (NMP) is further added as a dispersion solvent. The three substances are next kneaded for preparation of the negative electrode materials mixture 302b. After the negative electrode materials mixture 302b has been applied to both, sides of a 10-µm thick copper foil (negative electrode metallic foil 131), except for a current-collecting section (the exposed negative-electrode metallic foil section 302c); the negative electrode body 302 having a 70-µm thickness without the copper foil is fabricated through drying, press working, and cutting.

While the use of the negative electrode materials mixture 302b which contains amorphous carbon has been described in the present embodiment, the negative electrode materials mixture 302b may contain, for example, natural graphite or any other artificial graphite materials that enable insertion and/or desorption of lithium ions, or may contain cokes or any other appropriate carbonaceous materials. These materials constituting the negative electrode materials mixture 302b may be, for example, flaky, globular, fibrous, or clumpy in the shape of their particles.

When the positive electrode body 301 is to be made, flaky graphite and PVDF are first added as an electrically conductive material and a binder, respectively, to lithium manganate ($LiMn_2O_4$) at a mass rate of 1:1:10 and NMP is further added as a dispersion solvent. The four substances are next kneaded for preparation of the positive electrode materials mixture 301b. After the positive electrode materials mixture 301b has been applied to both sides of a 20-µm thick aluminum foil (positive electrode foil 301a), except for a current-collecting section (the exposed positive-electrode metallic foil section 301c), the positive electrode body 301 having a 90-µm thickness without the aluminum foil is fabricated through drying, press working, and cutting.

While the use of the positive electrode materials mixture 301b which contains lithium manganate has been described in the present embodiment, the positive electrode materials mixture 301b may contain, for example: any other lithium manganese oxides having a spinel crystalline structure; lithium-manganese composite oxides partly replaced by or doped with a metal element; lithium cobaltate or lithium titanate both of which have a laminar crystal structure; or lithium-metal composite oxides formed by a part of the lithium cobaltate or lithium titanate being replaced or doped with a metal element.

In addition, although the use of PVDF as a binder in those coated sections of the positive electrode body 301 and negative electrode body 302 has been described in the present embodiment, the binder may instead be a polymer or mixture of, for example, polytetrafluoroethylene, polyethylene; polystyrene, polybutadiene, butyl rubber, nitrile rubber, styrene butadiene rubber, polysulfide rubber, nitrocellulose, cyanoethyl cellulose, various kinds of latex, acrylonitrile, vinyl fluoride, vinylidene fluoride, propylene fluoride, chloroprene fluoride, or acrylic resins.

Figure 4:
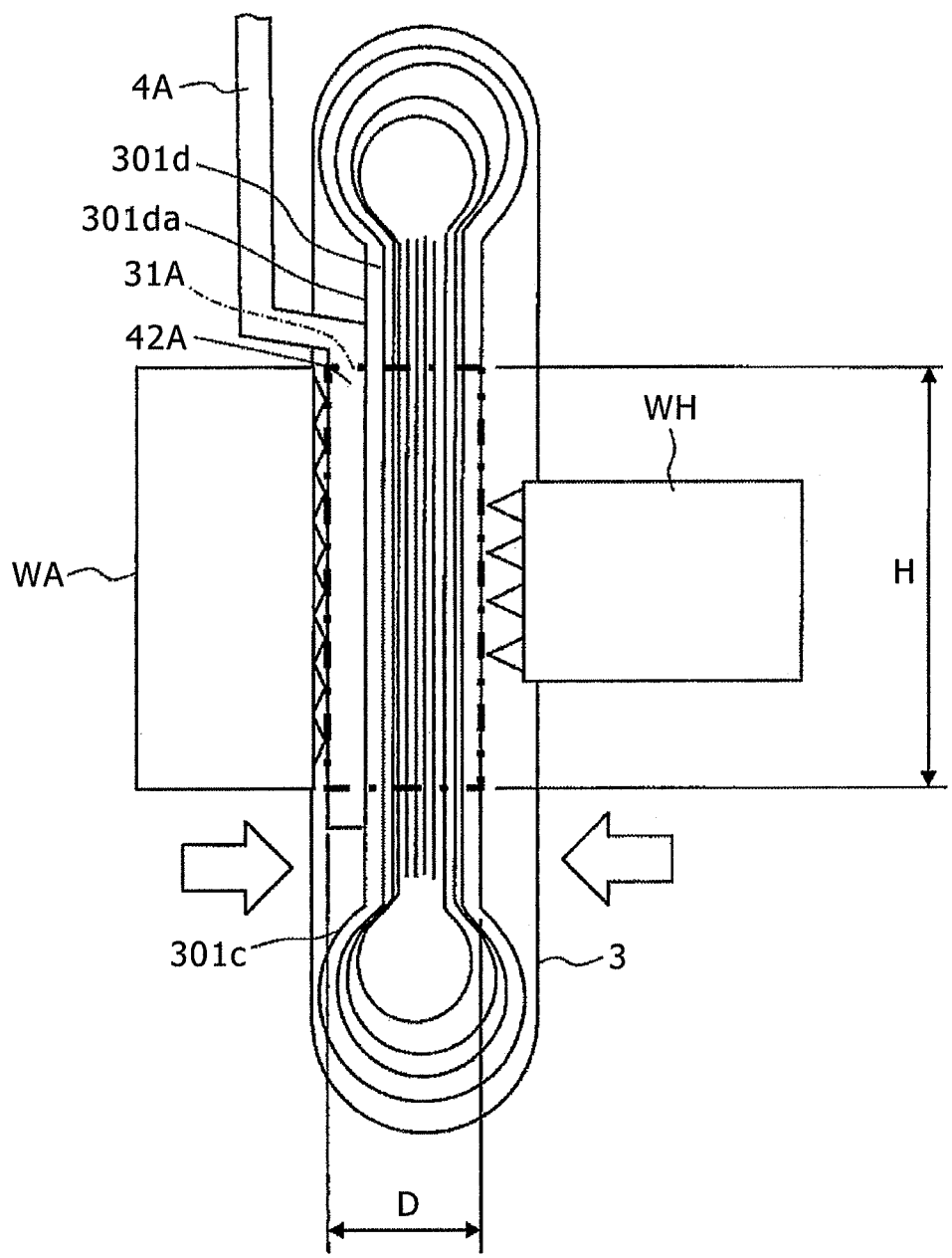
FIG. 4 is a side view schematically showing the step of connecting a current-collector plate to the electrode group shown in FIG. 3.

FIG. 4 schematically shows the step of connecting a current-collector plate to the electrode group shown in FIG. 3. FIG. 5 schematically shows the step of disposing pressure sensitive adhesive tapes on the press-joined section between the electrode group and current-collector plate shown in FIG. 4. Process steps relating to the positive electrode side will be described below with reference to FIGS. 4 and 5, and the steps relating to the negative electrode side also are substantially the same as below.

As shown in FIG. 4, the connection part 42A of the positive electrode current-collector plate 4A is disposed on one surface, 301da, of the bundled positive-electrode flat sheet-like section 301d that has been formed by the exposed positive electrode foil section 301c Of the electrode group 3 being bundled. After that, the exposed positive electrode foil section 301c of the electrode group 3 and the connection part 42A of the positive electrode current-collector plate 4A are made to abut one another at respective planar sections. Subsequently, the section and the part are press-joined by means of laser welding, resistance welding, friction stir welding, or the like.

More specifically, ultrasonic welding is used as the welding method in which after the exposed positive electrode foil section 301c of the electrode group 3 and the connection part 42A of the positive electrode current-collector plate 4A have been made to abut on one another at the respective planar sections, a horn WH is placed at the exposed positive electrode foil section 301c of the electrode group 3 and an anvil WA is placed at the connection part 42A of the positive electrode current-collector plate 4A. Next while the bundled positive-electrode flat sheet-like section 301d of the exposed positive electrode foil section 301C and the connection part 42A are being held in a sandwiched condition between the horn WH and the anvil WA, the horn WH is vibrated to form the press-joined section 31A by joining the respective metals together by means of the friction generated during the vibration. Layout of the horn WH, the anvil WA, and other tools to be used during ultrasonic welding can be changed as appropriate.

The press-joined section 31A here is a region occupied by the bundled positive-electrode flat sheet-like section 301d of the exposed positive electrode foil section 301c and the connection part 42A of the positive electrode current-collector plate 4A while these sections are held in a sandwiched condition between the horn WH and the anvil WA. In the example of FIG. 4, the region occupied by the bundled positive-electrode flat sheet-like section 301d and the connection part, 42A has height H and thickness D.

Figure 5:
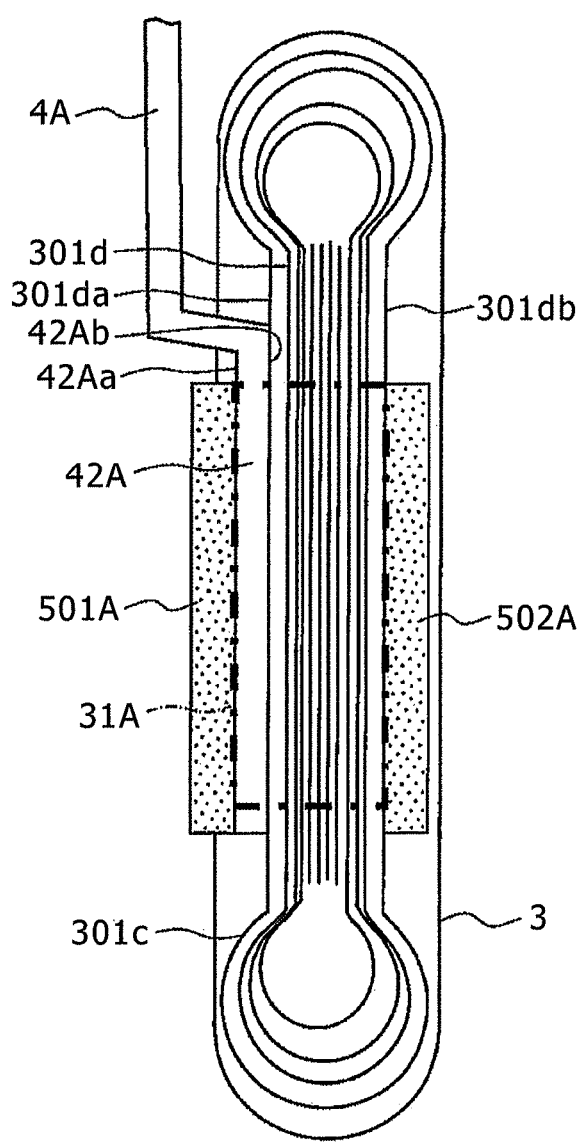
FIG. 5 is a side view schematically showing the step of disposing pressure sensitive adhesive tapes on a press-joined section between the electrode group and current-collector plate shown in FIG. 4.

Next as shown in FIG. 5, the pressure sensitive adhesive tape 502A is disposed so as to cover, among all regions relating to the press-joined section 31A, a surface of a planar portion of the bundled positive-electrode flat sheet-like section 301d of the exposed positive electrode foil section 301c (i.e., the surface opposed to the surface. 301da placed in an abutting and connected manner with the connection part 42A of the positive electrode current-collector plate 4A). Similarly, the pressure sensitive adhesive tape 501A is disposed so as to cover a surface 42Aa of a planar portion of the connection part 42A of the positive electrode current-collector plate 4A (i.e., the surface opposed to a surface 42Ab placed in an abutting and connected manner with the bundled positive-electrode flat sheet-like section 301d of the exposed positive electrode foil section 301c). Pressure sensitive adhesive taping may only be done on, among all regions relating to the press-joined section 31A, only the 301db surface side of the planar portion of the bundled, positive-electrode flat sheet-like section 301d of the exposed positive electrode foil section 301c. Alternatively, only a part of the surface 42Aa of the planar portion of the connection part 42A of the positive electrode current-collector plate 4A may be taped. Further alternatively, taping may be done only on part of the surface 301db of the planar portion of the bundled positive-electrode flat sheet-like section 301d of the exposed positive electrode foil section 301c or only on part of the surface 42Aa of the planar portion of the connection part 42A of the positive electrode current-collector plate 4A.

Tapes with an acrylic or any other highly pressure sensitive adhesive layer formed on a polyolefinic or any other base film, both of which are highly resistant to organic solvents, may be useable by way of example as the pressure sensitive adhesive tapes 501A, and 502A. The acrylic or any other highly pressure sensitive adhesive layer and polyolefinic or any other base film that are highly resistant to organic solvents are resistant to solvents used in electrolyte solutions.

In this way, in the present (first) embodiment, pressure sensitive adhesive taping with 501A and 502A is done on at least a portion of the press-joined sections 31A and 31B formed by the exposed positive electrode foil sections 301c and 302c of the electrode group 3 and the connection parts 42A and 42B of the current-collector plates 4A and 4B. In particular, among all regions relating to the press-joined sections 31A and 31B, at least one of the outer surfaces of planar portions of the exposed positive electrode foil sections 301c and 302c that abut the anvil WA and/or the horn WH, and the outer surfaces of planar portions of connection portions 42A and 42B of the current-collector plates 4A and 4B are taped. Consequently, a fall-off of any trace pieces of metal that might arise from the outer surfaces of the metallic foil exposed sections 301c and 302c and from those of the connection parts 42A and 42B can be prevented. Thus, when the electrode group 3 that has been connected to the current-collector plates 4A and 4B are stored in the battery container, in a case where pieces of metal occur on the outer surfaces of the metallic foil exposed sections 301c and 302c and those of the connection-parts 42A and 42B, entry of these pieces of metal as foreign matters into the electrode group 3 would be prevented.

Second Embodiment

Next, a prismatic secondary battery according to a second embodiment of the present invention will be described below with reference to FIGS. 6 and 7.

Figure 6:
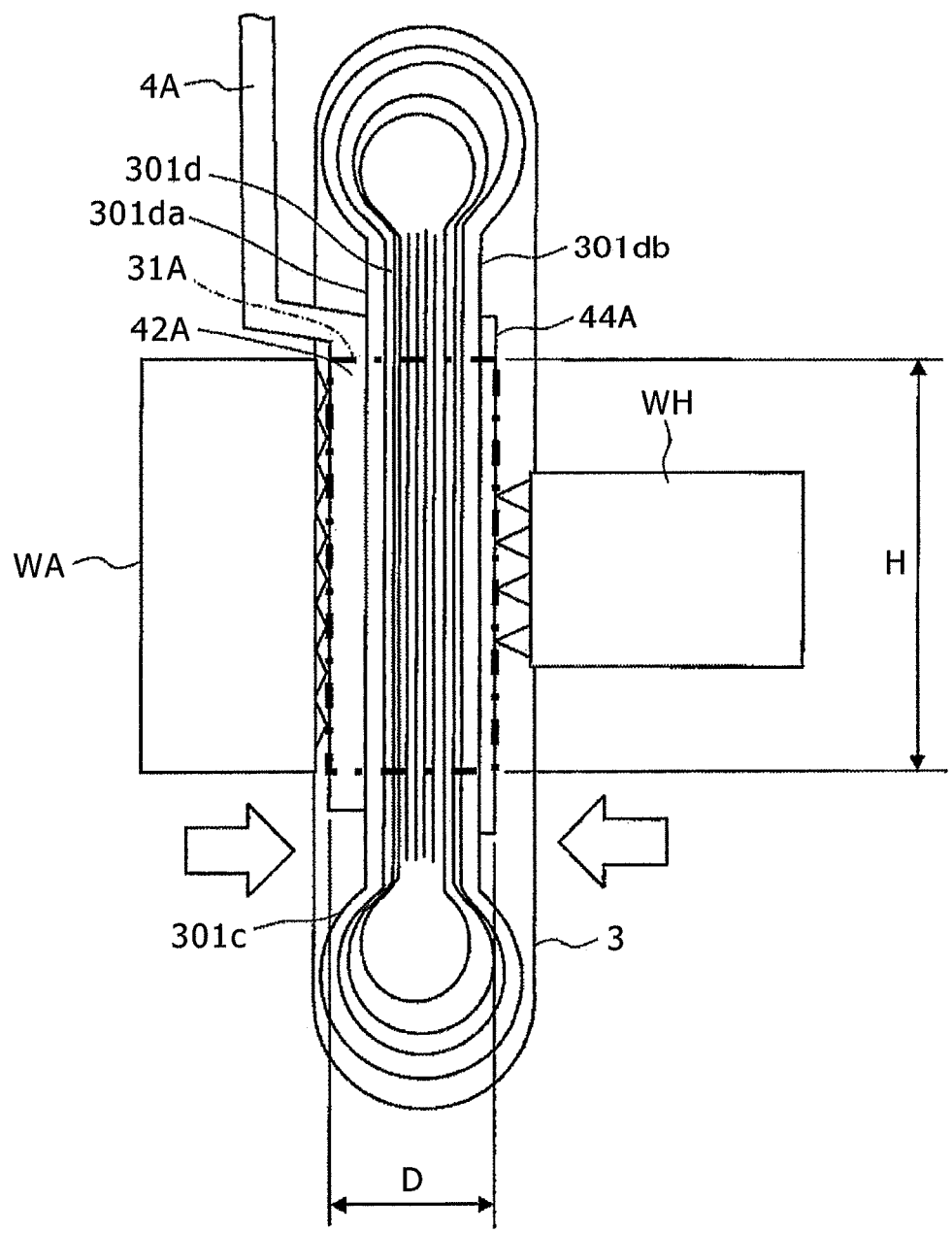
FIG. 6 is a side view schematically showing the step of connecting a current-collector plate and a protecting plate to an electrode group of a prismatic secondary battery according to a second embodiment of the present invention.

FIG. 6 schematically shows the step of connecting a current-collector plate and a protecting plate to an electrode group of the prismatic secondary battery according to the second embodiment of the present invention. FIG. 7 schematically shows the step of disposing pressure sensitive adhesive tapes on a press-joined section between the electrode group, current-collector plate, and protecting plate shown in FIG. 6.

Figure 7:
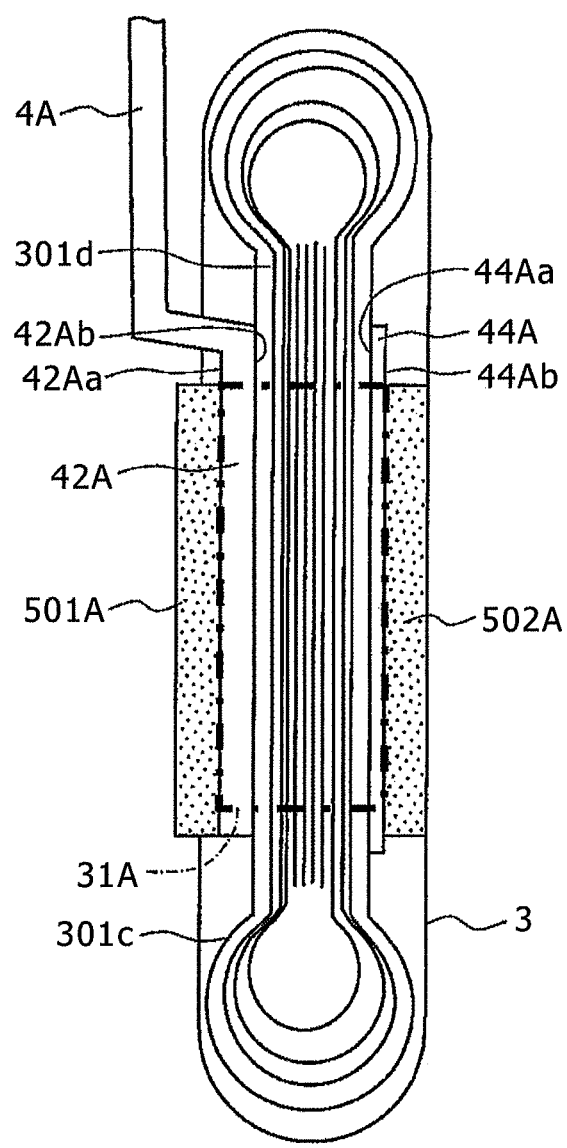
FIG. 7 is a side view schematically showing the step of disposing pressure sensitive adhesive tapes on a press-joined section between the electrode group, current-collector plate, and protecting plate shown in FIG. 6.

The second embodiment shown in FIGS. 6 and 7 differs from the first embodiment of FIGS. 1 to 5 in that a metallic protecting plate is disposed on one surface of a bundled flat sheet-like section formed by a metallic foil exposed section being bundled into a flat sheet-like shape. Other configurational aspects are substantially the same as those in the first embodiment. Substantially the same constituent elements as those of the first embodiment shown in FIGS. 1 to 5, therefore, are each assigned the same reference number, and description of these elements is omitted herein. While the following description referring to FIGS. 6 and 7 relates to the positive electrode side, the description also applies to the negative electrode side.

As shown in FIG. 6, in the present (second) embodiment, the connection part 42A of the positive electrode current-collector plate 4A is disposed on one surface, 301da, of the bundled flat sheet-like section 301d formed by the metallic foil exposed section 301c of the electrode group 3 being bundled into a flat sheet-like shape. The positive electrode protecting plate (metal plate) 44A is disposed on the other surface, 301db, of the bundled flat sheet-like section 301d. The Surfaces of the positive electrode protecting plate 44A, metallic foil exposed section 301c, and connection part 42A have respective planar portions abutting each other while the elements 44A, 301c, and 42A are press-joined.

To be more specific, after the positive electrode protecting plate 44A, the exposed positive electrode foil section 301c, and the connection part 42A have had the surfaces of the respective planar portions abutting each other, a horn WH is placed at the positive electrode protecting plate 44A and an anvil WA is placed at the connection part 42A of the positive electrode current collector plate 4A. Next while the positive electrode protecting plate 44A, the bundled positive-electrode flat sheet-like section 301d of the exposed positive electrode foil section 301c, and the connection part 42A are being held in a sandwiched condition between the horn WH and the anvil WA, the horn WH is vibrated to form the press-joined section 31A by joining the respective metals together by means of the friction generated during the vibration.

The positive electrode protecting plate 44A here is fabricated from aluminum or an aluminum alloy. In general, this element is preferably thinner than the positive electrode current-collector plate 4A and thicker than the positive electrode foil 301a (see FIG. 3). The thickness of the element should preferably be nearly 0.1 mm, for example.

In addition, as shown in FIG. 7, the pressure sensitive adhesive tape 502A is disposed so as to cover, among all regions relating to the press-joined section 31A, a surface 44Ab of a planar portion of the positive electrode protecting plate 44A (i.e., the surface opposed to a surface 44Aa placed in an abutting and connected manner with the bundled positive-electrode flat sheet-like section 301d of the exposed positive electrode foil section 301c). The pressure sensitive adhesive tape 501A is disposed so as to cover the surface 42Aa of the planar portion of the connection part 42A of the positive electrode current-collector plate 4A.

In this way, in the present (second) embodiment, the positive electrode protecting plate 44A is disposed on the surface 301db located at a side opposite to the positive electrode current-collector plate 4A, the surface 301db being part, of the bundled positive-electrode flat sheet-like section 301d of the exposed positive electrode foil section 301c. Moreover, among all regions of the press-joined sections 31A and 31B formed by the electrode protecting plate, the metallic foil exposed sections 301c and 302c of the electrode group 3, and the connection parts 42A and 42B, at least one of the outer surface of the planar portion of the electrode protecting plate that abuts on the anvil WA and the horn WH, and the outer surfaces of the planar portions of the connection parts 42A and 42B are covered with the pressure sensitive adhesive tapes 501A and 502A. While avoiding rupture of and damage to the exposed electrode foil sections 301c and 302c, the present embodiment enables it to prevent a fall-off of small pieces of metal that might arise from the outer surface of the electrode protecting plate and the outer surfaces of the connection parts 42A and 42B of the current-collector plates 4A and 4B. Thus, in a case where the small pieces of metal occur on the outer surface of the electrode protecting plate and the outer surfaces of the connection parts 42A and 42B of the current-collector plates 4A and 4B, entry of these pieces of metal as foreign matters into the electrode group 3 can be further prevented.

Third Embodiment

Figure 8:
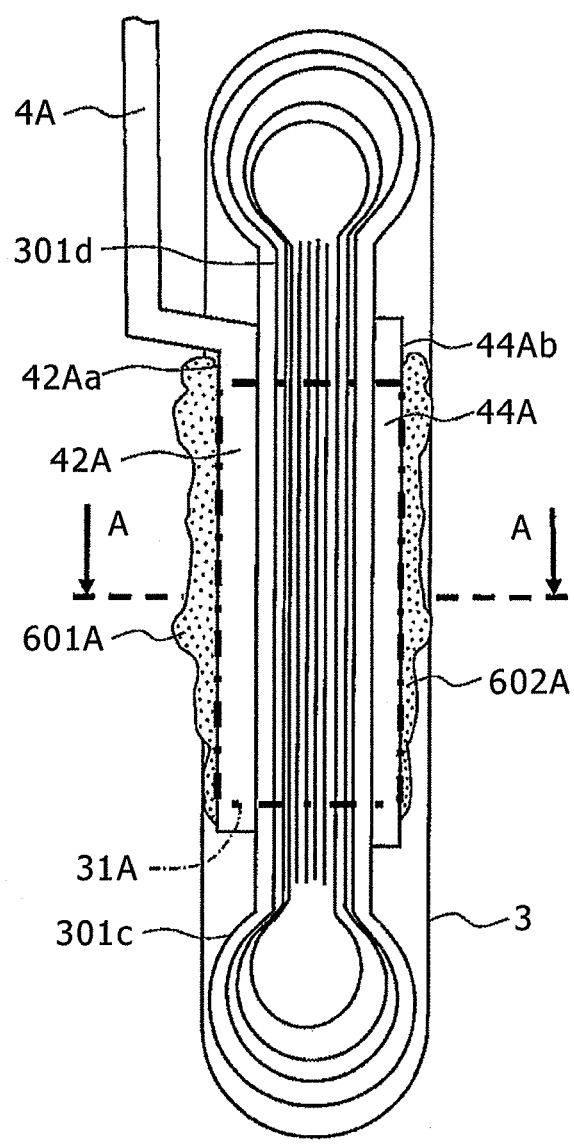
FIG. 8 is a side view schematically showing the step of disposing pressure sensitive adhesive tapes on a press-joined section between an electrode group, current-collector plate, and protecting plate of a prismatic secondary battery according to a third embodiment of the present invention.
Figure 9:
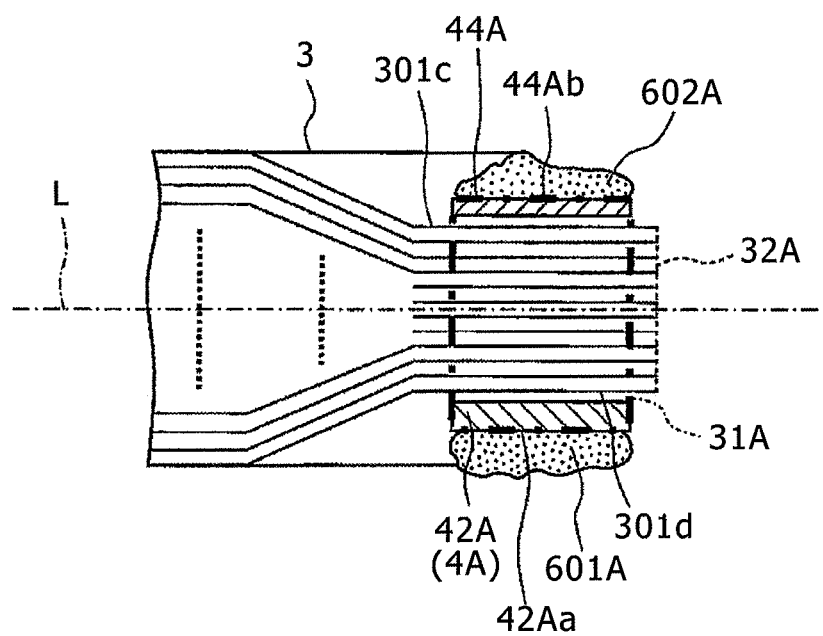
FIG. 9 is a perspective view of section A-A taken from a direction of an arrow in FIG. 8.

Next, a prismatic secondary battery according to a third embodiment of the present invention will be described below with reference to FIGS. 8 and 9. FIG. 8 schematically shows the step of disposing pressure sensitive adhesive tapes on a press-joined section between an electrode group, current-collector plate, and protecting plate of the prismatic secondary battery according to the third embodiment of the present invention. FIG. 9 is a perspective view of section A-A taken from a direction of an arrow in FIG. 8.

The third embodiment shown in FIGS. 8 and 9 differs from the second embodiment of FIGS. 6 and 7 in that plastic pressure sensitive adhesives or hot-melt resin adhesives are disposed on a press-joined section. Other configurational aspects are substantially the same as in the second embodiment. Substantially the same constituent elements as those of the second embodiment shown in FIGS. 6 and 7, therefore, are each assigned the same reference number, and description of these elements is omitted herein. While the following description referring to FIGS. 8 and 9 relates to the positive electrode side, the description also applies to the negative electrode side.

As shown in FIGS. 8 and 9, in the present (third) embodiment, a plastic pressure sensitive adhesive 602A is disposed (applied) so as to cover, among all regions of the press-joined section 31A, the surface 44Ab of the planar portion of the positive electrode protecting plate 44A. A plastic pressure sensitive adhesive 601A is disposed (applied) so as to cover the surface 42Aa of the connection part 42A of the positive electrode current-collector plate 4A.

Acrylic or any other pressure sensitive adhesives highly resistant to organic solvents may be useable by way of example as the pressure sensitive adhesives 601A and 602A. The pressure sensitive adhesives 601A and 602A may be replaced by polyolefinic or any other hot-melt resin adhesives highly resistant to electrolyte solutions.

In this way, in the present (third) embodiment, among all regions of the press-joined sections 31A and 31B formed by the electrode protecting plate, the metallic foil exposed sections 301c and 302c of the electrode group 3; and the connection parts 42A and 42B of the current-collector plates 4A and 4B, the outer surface of the planar portion of the electrode protecting plate and the outer surfaces of the planar portions of the connection parts 42A and 42B of the current-collector plates 4A and 4B are covered with the pressure sensitive adhesives 601A and 602A or hot-melt resin adhesives. As can be seen from this, therefore, the pressure sensitive adhesives 601A and 602A or hot-melt resin adhesives can be disposed flexibly in accordance with particular shapes and positions of the press-joined sections 31A and 31B. Thus, a fall-off of small pieces of metal that might arise on the outer surface of the electrode protecting plate and the outer surfaces of the connection parts 42A and 42B of the current-collector plates 4A and 4B can be reliably prevented with such simplified configuration. The entry of these pieces of metal as foreign matters into the electrode group 3 can also be prevented more effectively.

Fourth Embodiment

Figure 10:
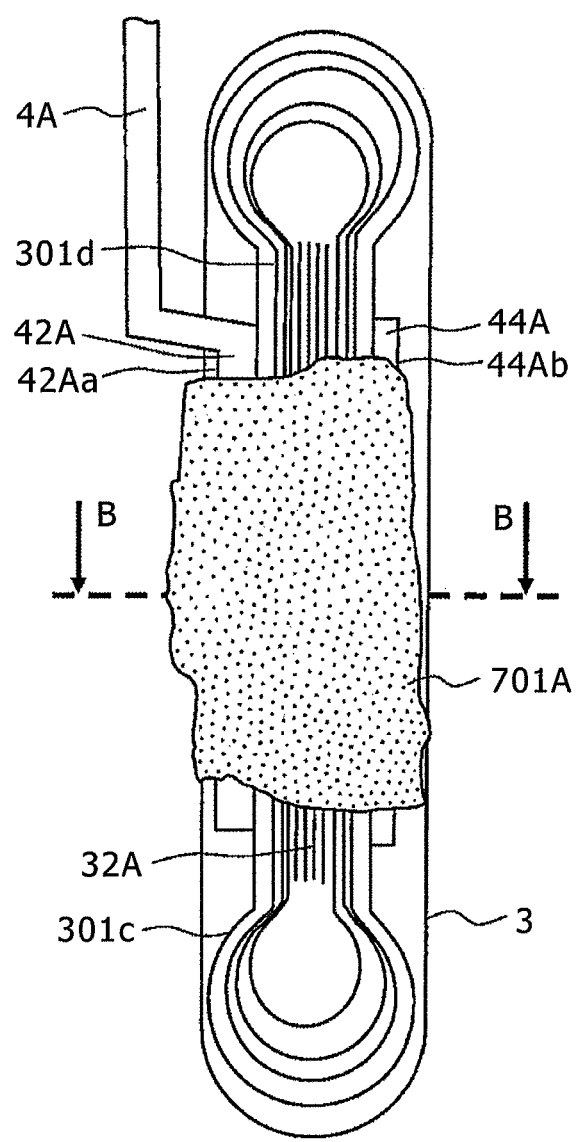
FIG. 10 is a side view schematically showing the step of disposing pressure sensitive adhesive tapes on a press-joined section between an electrode group, current-collector-plate, and protecting, plate of a prismatic secondary battery according to a fourth embodiment of the present invention.
Figure 11:
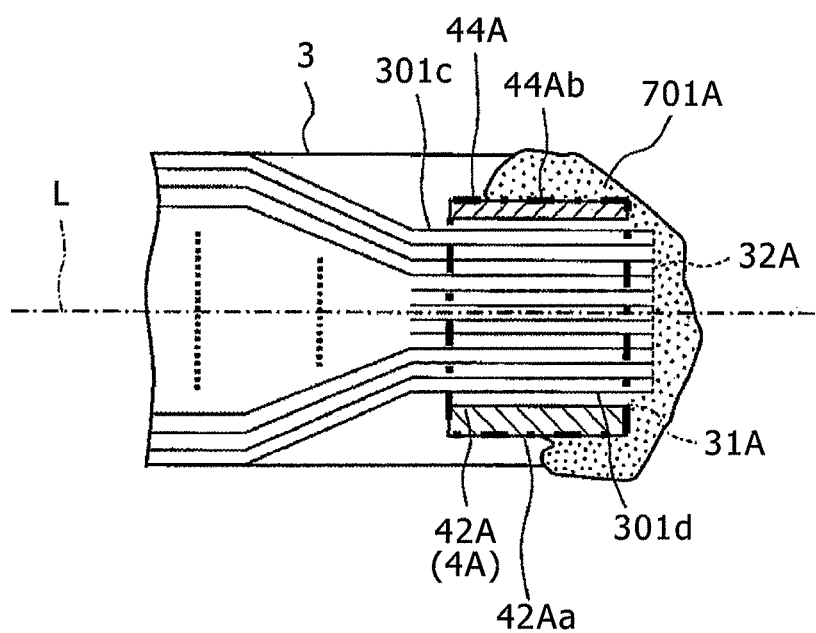
FIG. 11 is a perspective view of section B-B taken from a direction of an arrow in FIG. 10.

Next, a prismatic secondary battery according to a fourth embodiment of the present invention will be described below with reference to FIGS. 10 and 11. FIG. 10 schematically shows the step of disposing pressure sensitive adhesive tapes on a press-joined section between, an electrode group, current-collector plate, and protecting plate of the prismatic secondary battery according to the fourth embodiment of the present invention. FIG. 11 is a perspective view of section B-B taken from a direction of an arrow in FIG. 10.

The fourth embodiment shown in FIGS. 10 and 11 differs from the third embodiment of FIGS. 8 and 9 in that plastic pressure sensitive adhesives or hot-melt resin adhesives are disposed on not only a press-joined section but also other sections. Other configurational aspects are substantially the same as in the third embodiment. Substantially the same constituent elements as those of the third embodiment shown in FIGS. 8 and 9, therefore, are each assigned the same reference number, and description of these elements is omitted herein. While the following description referring to FIGS. 10 and 11 relates to the positive electrode side, the description also applies to the negative electrode side.

As described in the third embodiment, in a case where among all regions of the press-joined sections 31A and 31B, for example, the outer surface of the planar portion of the electrode protecting plate and the outer surfaces of the planar portions of the connection parts 42A and 42B of the current-collector plates 4A and 4B are covered with the pressure sensitive adhesives 601A and 602A or hot-melt resin adhesives, if small pieces of metal that may occur at the press-joined sections 31A and 31B enter the battery container, the small pieces of metal could enter a space between the metallic foils of the metallic foil exposed sections 301c and 302c of the electrode group 3 via those edges (e.g., the positive electrode edge 32A in FIG. 9) of the metallic foil exposed sections 301c and 302c that lie in the direction of the winding axis L. In addition, small pieces of metal that may occur between the metallic foils of the metallic foil exposed sections 301c and 302c of the electrode group 3, at the press-joined sections 31A and 31B, could exit the electrode group 3 via the edges of the metallic foil exposed sections 301c and 302c that lie in the direction of the winding axis L. The pieces subsequently could enter the electrode group 3 once again via, for example, the curved sections 3a and 3c (see FIG. 2) of the metallic foil exposed sections 301c and 302c.

In the fourth embodiment, therefore; as shown in FIG. 11, among all regions of the press-joined section 31A, the surface 44Ab of the planar portion of the positive electrode protecting plate 44A and the surface 42Aa of the planar portion of the connection part 42A of the positive electrode current-collector plate 4A are covered with a pressure sensitive adhesive 701A. The edge 32A of the metallic foil exposed section 301c Of the electrode group 3 that lies in the direction of the winding axis L is also covered with the pressure sensitive adhesive 701A. More specifically, as shown in FIG. 10, among all regions of that edge 32A of the metallic foil exposed section 301c of the electrode group 3 that lies in the direction of the Winding axis L, at least a portion of the edge of the bundled positive-electrode flat sheet-like section 301d of the exposed positive electrode foil section 301c that lies in the direction of the winding axis L (i.e., a portion of the edge of the exposed positive electrode foil section 3016 in the direction of the winding axis L, the portion corresponding to the press-joined section 31A) is covered with the pressure sensitive adhesive 701A.

The pressure sensitive adhesive 701A may be replaced by, for example, any one of the plastic pressure sensitive adhesive tapes or hot-melt resin adhesives described in the first and third embodiments.

As described above, in the fourth embodiment, among all regions of the press-joined sections 31A and 31B, the outer surface of the planar portion of the electrode protecting plate and the outer surfaces of the planar portions of the connection parts 42A and 42B of the current-collector plates 4A and 4B are covered with a pressure sensitive adhesive, a hot-melt resin adhesive, or the like. The edge of the metallic foil exposed section 301c of the electrode group 3 that lies in the direction of the winding axis L is also covered with a pressure sensitive adhesive, a hot-melt resin adhesive, or the like. Thus, while preventing a fall-off of the small pieces of metal that may occur on the outer surface of the electrode protecting plate and the outer surfaces of the connection parts 42A and 42B of the current-collector plates 4A and 4B, the present embodiment is effective in preventing more reliably the possible entry of the small pieces of metal into the electrode group 3 as foreign substances via the edge of the metallic foil exposed section 301c of the electrode group 3 that lies in the direction of the winding axis L. In addition, even in a case where small pieces of metal occur between the metallic foils of the metallic foil exposed sections 301c and 302c in the connecting steps, the present embodiment would be effective in preventing the exit of the small pieces of metal from the electrode group 3, and preventing entry of the small pieces of metal into a space between other metallic foils of the electrode group 3 as foreign substances.

It should be noted that part or all of burrs can also be covered with the above-described pressure sensitive adhesives or hot-melt resin adhesives to prevent occurrence of any foreign substances which may cause micro short circuit. The burrs could occur on the surface of the electrode protecting plate, the surfaces of the current-collector plates 4A and 4B, and to-be-cut surfaces of the metallic foils 301a, 302a constituting the electrode group 3 during normal operations.

In addition, although in the above-described embodiments where substantially the same connections have been conducted upon the positive electrode side and the negative electrode side and substantially the same resin materials are disposed on the press-joined sections, the resin materials may be disposed only on one of the positive electrode side and the negative electrode side. Moreover, the form of the connection, composition and layout of the resin materials, or other factors may differ between both electrode sides.

The present invention is not limited to the first to fourth embodiments and may embrace varieties of modifications. The first to fourth embodiments, for example, have only been described in detail for a better understanding of the invention and are therefore not necessarily limited to the configurations containing all described constituent elements. In addition, part of the configuration of a certain embodiment may be replaced by the configuration of another embodiment and the configuration of a certain embodiment may be added to the configuration of another embodiment. Furthermore, part of the configuration of one of the first to fourth embodiments may be added to, deleted from, and/or replaced by the other embodiments.

DESCRIPTION OF REFERENCE SYMBOLS

1 Battery casing
3 Electrode group
3a, 3b Curved sections of electrode group
3c Planar section of electrode group
4A Positive electrode current-collector plate (Connection plate)
4B Negative electrode current-collector plate (Connection plate)
6 Cover
8A Positive electrode external terminal (Electrode terminal)
8B Negative electrode external terminal (Electrode terminal)
20 Prismatic secondary battery
31A Positive electrode side press-joined section
31B Negative electrode side press-joined section
32A End face of exposed positive electrode foil section
32B End face of exposed negative electrode foil section
42A Connection part of positive electrode current collector plate
42B Connection part of negative electrode current collector plate
44A Positive electrode protecting plate (Metal plate)
301 Positive electrode body (Positive electrode)
301a Positive electrode foil (Metal foil)
301b Positive electrode materials mixture
301c Exposed positive electrode foil (Metallic foil exposed section)
301d Bundled positive-electrode flat sheetlike section
302 Negative electrode body (Negative electrode)
302a Negative electrode foil (Metal foil)
302b Negative electrode materials mixture
302c Exposed negative electrode foil (Metallic foil exposed section)
302d Bundled negative-electrode flat sheet-like section
303 Separator
501A, 502A, 501B, 502B Pressure sensitive adhesive tapes (Resin materials)
601A, 602A, 701A Pressure sensitive adhesives (Resin materials)
WA Anvil (Immobilizer)
WH Horn (Ultrasonic vibrator)

The invention claimed is:
1. A prismatic secondary battery, comprising:
an electrode group including electrodes formed of positive and negative electrodes each having an active material layer coated on a surface of a metallic foil, the electrodes formed of positive and negative electrodes being flatly wound together with a separator intervening the positive and negative electrodes, the positive and negative electrodes being each formed with a metallic foil exposed section at one end in a direction of a winding axis; and
a connection plate that electrically connects the electrode group and electrode terminals, wherein:
the metallic foil exposed sections of the electrode group are press-joined to the connection plates;

at least a portion of the press-joined sections constituted by the metallic foil exposed sections and the connection plates is covered with a resin material; and an interior surface of the resin material is in planar contact with a surface of the connection plate and wherein the connection plate directly contacts an adjacent metallic foil exposed section.

2. The prismatic secondary battery according to claim 1, further comprising:

a metal plate located on a surface of the metallic foil exposed sections, the surface being opposed to a surface to which the connection plate is connected, wherein:

while the metallic foil exposed section is being held in a sandwiched condition between the connection plate and the metal plate, the connection plate, the metallic foil exposed section, and the metal plate are press-joined; and the press-joined section includes the connection plate, the metallic foil exposed section, and the metal plate.

3. The prismatic secondary battery according to claim 1, wherein the resin material is formed from at least one selected from the group formed of plastic pressure sensitive adhesive tapes, plastic pressure sensitive adhesives, and hot-melt resin adhesives.

4. The prismatic secondary battery according to claim 1, wherein:

the metallic foil exposed sections and the connection plates are press-joined with respective planar sections abutting one another at respective surfaces; and at each of the press-joined sections constituted by the metallic foil exposed sections and the connection plates, the resin material covers a surface opposed to a surface of the planar section of the metallic foil exposed section and/or a surface opposed to a surface of the planar section of the connection plate.

5. The prismatic secondary battery according to claim 2, wherein:

the connection plate, the metallic foil exposed section, and the metal plate are press-joined with respective planar sections abutting each other at respective surfaces; and at the press-joined section constituted by the connection plate, the metallic foil exposed section, and the metal plate, the resin material covers a surface opposed to a surface of the planar section of the connection plate and/or a surface opposed to a surface of the planar section of the metal plate.

6. The prismatic secondary battery according to claim 1, wherein the resin material covers at least a portion of those edges of the metallic foil exposed sections that lie in the direction of the winding axis.

7. The prismatic secondary battery according to claim 2, wherein the connection plate and the metal plate directly contact opposing surfaces of an adjacent metallic foil exposed section, and the resin material is in direct contact with surfaces of the connection plate and the metal plate that are opposite from the surfaces that directly contact the adjacent metallic foil exposed section.

8. The prismatic secondary battery according to claim 1, wherein the resin material is formed from hot-melt resin adhesives.

* * * * *